(12) United States Patent (10) Patent No.: US 12,570,856 B2

Majeska et al. (45) Date of Patent: *Mar. 10, 2026

(54) PIGMENTABLE, NON-ASPHALT BASED, SEALANT COMPOSITION AND METHODS OF PRODUCTION AND USE

(71) Applicant: ADVENTUS MATERIAL STRATEGIES, LLC, Daniel Island, SC (US)

(72) Inventors: Brian J. Majeska, Mount Pleasant, SC (US); Joseph Drbohlav, III, Inman, SC (US)

(73) Assignee: Adventus Material Strategies, LLC, Daniel Island, SC (US)

( * ) Notice: Subject to any disclaimer, the term of this patent is extended or adjusted under 35 U.S.C. 154(b) by 543 days.

This patent is subject to a terminal disclaimer.

(21) Appl. No.: 18/096,069

(22) Filed: Jan. 12, 2023

(65) Prior Publication Data

US 2023/0143069 A1 May 11, 2023

Related U.S. Application Data

(62) Division of application No. 17/218,423, filed on Mar. 31, 2021, now Pat. No. 11,572,472.

(51) Int. Cl.
| | |
|---|---|
| *C08L 93/04* | (2006.01) |
| *C09K 3/10* | (2006.01) |

(52) U.S. Cl.
CPC ........... *C08L 93/04* (2013.01); *C08L 2207/04* (2013.01); *C09K 3/1006* (2013.01)

(58) Field of Classification Search
None
See application file for complete search history.

(56) References Cited

U.S. PATENT DOCUMENTS

| | | | |
|---|---|---|---|
| 4,629,754 A | 12/1986 | Syrier et al. | |
| 7,288,581 B2 | 10/2007 | Ferrell et al. | |
| 7,514,018 B2 | 4/2009 | Schilling et al. | |
| 7,658,862 B2 | 2/2010 | Talamoni | |
| 8,088,858 B2 | 1/2012 | Pharr | |
| 8,381,483 B1 | 2/2013 | Goldman | |
| 8,814,465 B2 | 8/2014 | Vitale et al. | |
| 9,499,948 B2 | 11/2016 | Greer et al. | |
| 2008/0255290 A1 | 10/2008 | Rath et al. | |
| 2010/0184903 A1* | 7/2010 | Pharr ........................ | C08K 5/01 |
| | | | 524/451 |
| 2010/0233146 A1 | 9/2010 | McDaniel | |
| 2011/0257318 A1 | 10/2011 | Neuville et al. | |

| | | | |
|---|---|---|---|
| 2014/0083331 A1 | 3/2014 | Fini | |
| 2015/0210882 A1 | 7/2015 | Burdzy et al. | |
| 2016/0264821 A1 | 9/2016 | Nelson et al. | |
| 2016/0304698 A1* | 10/2016 | Bindschedler ........... | C09K 3/12 |
| 2018/0371704 A1 | 12/2018 | Wilkins et al. | |
| 2019/0177925 A1 | 6/2019 | Kriech et al. | |
| 2019/0226159 A1 | 7/2019 | Marienfeld et al. | |
| 2019/0256417 A1 | 8/2019 | Stepp et al. | |
| 2020/0032063 A1 | 1/2020 | Lungren et al. | |
| 2021/0206695 A1 | 7/2021 | Lorenc et al. | |

FOREIGN PATENT DOCUMENTS

| | | |
|---|---|---|
| CN | 102261260 | 11/2011 |
| CN | 202039263 | 11/2011 |
| CN | 105273691 | 1/2016 |
| CN | 109499229 | 3/2019 |
| CN | 209873531 | 12/2019 |
| CN | 111117569 | 8/2020 |
| FR | 2995890 | 9/2012 |
| JP | 10219214 | 8/1998 |
| JP | 3817138 | 8/2006 |
| KR | 100665189 | 9/2005 |
| KR | 101820380 | 6/2017 |
| KR | 102054908 | 8/2018 |
| KR | 20180096037 | 8/2018 |

OTHER PUBLICATIONS

PCT/US2022/022487—International Preliminary Report With International Search Report and Written Opinion; Jun. 15, 2022.
PCT International Search Report and Written Opinion; PCT/US2020/044876; Oct. 8, 2020; US.
Crumb Rubber; Wikipedia (https://en.wikipedia.org/wiki/Crumb_rubber; p. 2; US.
U.S. Appl. No. 17/225,369; "Crack Sealant Method and Composition for Resistance To UV Aging and Weathering"; filed Apr. 8, 2021; Inventor; Joseph Drbohlav.
U.S. Appl. No. 17/218,423; "Pigmentable, Non-Asphalt Based, Sealant Composition and Methods of Production and Use"; filed Mar. 31, 2021; Inventor; Brian J. Majeska.

* cited by examiner

*Primary Examiner* — Christopher M Rodd
(74) *Attorney, Agent, or Firm* — Dennis D. Brown; Brown Patent Law, P.L.L.C.

(57) ABSTRACT

A fully pigmentable, non-asphalt based, sealant composition for sealing cracks and joints in roads, streets, highways, sidewalks, pavements, and other concrete and asphalt surfaces. The pigmentable sealant is produced by (i) forming a non-asphalt base blend which contains a high concentration of a rosin ester material, (ii) neutralizing the color of the base blend using one or more color neutralizing materials, (iii) pigmenting the color-neutralized base blend to a desired final color, and (iv) adding one or more polymers to the pigmented blend to provide enhanced mechanical properties.

20 Claims, No Drawings

PIGMENTABLE, NON-ASPHALT BASED, SEALANT COMPOSITION AND METHODS OF PRODUCTION AND USE

RELATED CASE

This application is a divisional of U.S. patent application Ser. No. 17/218,423 filed Mar. 31, 2021, and claims the benefit of the filing date thereof.

FIELD OF THE INVENTION

The present invention relates to pigmentable, non-asphalt based, sealant compositions for sealing cracks and joints in roads, streets, highways, sidewalks, pavements, and other concrete and asphalt surfaces. The present invention also relates to methods of producing and using the pigmentable, non-asphalt based sealant compositions.

BACKGROUND OF THE INVENTION

Asphalt is commonly used as a base material for producing hot-applied crack and joint sealants for roads, pavements, and other asphalt and concrete surfaces. Asphalt-based sealants are relatively inexpensive, are water resistant, provide acceptable thermal performance over a range of temperature conditions, and can be modified by adding polymers to provide enhanced mechanical properties.

Unfortunately, because asphalt is a completely opaque, black material which is very difficult to pigment, efforts to change the color or shade of asphalt-based sealants to anything other than black or dark brown have been largely unsuccessful. The deep black color which is characteristic of asphalt-based sealants creates a significant visual contrast with the underlying concrete or aged (oxidized) asphalt pavement surfaces to which the sealants are commonly applied. This contrast is unappealing and can also interfere with the ability of automobile self-driving or self-steering sensor systems to identify lane markings.

Consequently, a need exists for a new, non-asphalt based, fully pigmentable crack and joint sealant composition which is inexpensive and water resistant, and which will provide mechanical and physical properties which are comparable to, or better than, those of the current asphalt-based compositions. The new sealant compositions will preferably have more of a transparent or light color that will enable the compositions to be pigmented to a wide range of final colors. By way of example, but not by way of limitation, the new pigmentable sealant compositions will preferably be useful for matching the color of, and sealing joints and cracks in, gray concrete pavements.

SUMMARY OF THE INVENTION

The present invention provides a pigmentable sealant composition, and methods of production and use, which alleviate the problems and satisfy the needs discussed above. The inventive composition, and method of production, use non-asphaltic raw materials to provide a color-neutralized, hot-applied crack and joint sealant material which (a) can be pigmented to generally any desired shade or color, (b) provides outstanding adhesion to concrete and other surfaces, and (c) also provides mechanical properties, physical properties, and water resistance similar or superior to asphalt.

In one aspect, there is provided a method of producing a pigmented sealant product composition for cracks and joints in pavements and other substrates. The method preferably comprises the steps of: (a) forming a sealant base blend having substantially no asphalt therein, the sealant base blend comprising (i) a rosin ester material, (ii) processing oil, and (iii) one or more plasticizers, the sealant base blend being formed at a sufficient temperature, and with agitation, stirring, and/or mixing, to melt the rosin ester material and incorporate the rosin ester material into the processing oil; (b) at least partially neutralizing a non-white shade or color of the sealant base blend, to produce an at least partially color-neutralized base blend, by adding one or more color-neutralizing materials to the sealant base blend, the one or more color-neutralizing materials comprising titanium dioxide; (c) pigmenting the at least partially color-neutralized base blend, to form a pigmented base blend, by adding one or more pigment materials to the at least partially color-neutralized base blend; and (d) adding one or more elastomeric polymer materials to the pigmented base blend to form the pigmented sealant product composition.

In another aspect, there is provided a pigmented sealant product composition for cracks and joints in pavements and other substrates. The pigmented sealant product composition preferably comprises: (a) a sealant base blend having substantially no asphalt therein which, based upon a total weight of the pigmented sealant product composition, comprises (i) from 5% to 30% by weight processing oil, (ii) from 0.5% to 6% by weight of at least one epoxidized ester of a vegetable oil, (iii) and more than 40% by weight of a rosin ester material which is melted and incorporated in the processing oil; (b) color neutralizing materials which at least partially neutralize a non-white shade or color of the sealant base blend and which, based upon the total weight of the pigmented sealant product composition, comprise (i) from 3% to 20% by weight of titanium dioxide and (ii) from 1% to 20% by weight of calcium carbonate; (c) one or more pigment materials which impart a non-white color or shade to the pigmented sealant product composition; and (d) from 2% to 20% by weight, based upon the total weight of the pigmented sealant product composition, of one or more elastomeric polymer materials.

Further aspects, features, and advantages of the present invention will be apparent to those skilled in the art upon reading the following detailed description of the preferred embodiments.

DETAILED DESCRIPTION OF THE PREFERRED EMBODIMENTS

The pigmented sealant composition provided by the present invention preferably comprises: (1) a sealant base blend which has substantially no (i.e., less than 1% and most preferably 0% by weight based upon the total weight of the base blend) asphalt therein; (2) one or more color-neutralizing materials (one of said one or more materials being titanium dioxide) which assist(s) in significantly or entirely neutralizing a non-white shade or color of the sealant base blend; (3) one or more pigment materials which impart a desired end color to the color-neutralized sealant base blend; and (4) one or more elastomeric polymer materials which modify the pigmented base blend to provide enhanced mechanical properties.

The sealant base blend used in the inventive composition preferably comprises a rosin ester material, processing oil, and one or more plasticizing materials. In accordance with the method of the present invention, the sealant base blend is preferably produced by: (i) heating the processing oil to a blending temperature in the range of from about 300° F. to about 350° F. (more preferably from about 320° to about 330° F.) while applying low shear agitation or mixing; (ii) adding the one or more plasticizers to the heated processing oil with low shear agitation or mixing and with continued heating as required to maintain the blending temperature; (iii) adding the rosin ester material with low shear agitation or mixing and with continued heating to maintain the blending temperature; and then (iv) continuing to agitate or mix the resulting blend at the blending temperature until the rosin ester material is melted and fully incorporated in the processing oil.

The amount of the rosin ester material added to the sealant base blend will preferably be greater than 40% by weight, or will be at least 41% or at least 42% or at least 43% or at least 44% or at least 45% by weight, based upon the total final weight of the inventive pigmented sealant composition after the titanium dioxide, any additional color-neutralizing materials, the one or more pigment materials, and the one or more elastomeric polymer materials have been added to the sealant base blend. The amount of the rosin ester material added to the sealant base blend will preferably be in the range of from 41% to about 65% by weight based upon the total final weight of the pigmented sealant composition.

Rosin esters commonly comprise amorphous, esterified mixtures of low molecular weight compounds produced from the pulping or processing of wood. The rosin ester material used in the inventive sealant composition can comprise a single rosin ester or a combination of two or more rosin esters. Rosin ester materials will typically have softening points of greater than 50° C. and needle penetration values of near 0 dmm at 25° C. The rosin ester material used in the inventive sealant composition will preferably have (a) a softening point in the range of from about 80° C. to about 120° C., more preferably from about 95° C. to about 110° C., and (b) an acid number of less than 20 mg/g and more preferably less than 15 mg/g.

To further facilitate the pigmenting process, the rosin ester material will preferably be relatively translucent or have a lighter color. The Gardner Color of the rosin ester material will preferably be less than 10.0 and will more preferably be less than 7.0.

Examples of rosin ester materials suitable for use in the inventive composition include, but are not limited to, pine-based pentaerythritol ester resins and pine-based glycerol ester resins. The rosin ester material will preferably be or comprise a pine-based pentaerythritol ester resin.

As will be understood by those in the art, processing oils are commonly used for blending with rubber and elastomer materials in various processes and applications. The processing oil used in forming the sealant base blend of the inventive composition will preferably comprise one or more aromatic, naphthenic, paraffinic, and/or vegetable oils. The processing oil will preferably (a) be relatively translucent or have a lighter color, which further facilitates the pigmenting process, (b) be effective for blending with the rosin ester material to produce a softening point of the base blend in the range of from about 40° to about 70° C. and a needle penetration value of the base blend in the range of from about 20 to about 80 dmm at 25° C., and (c) have an aromatic content of at least 40% by weight, or at least 45%, 50%, 55%, 60%, 65% or 70% by weight, based upon the total weight of the processing oil.

The amount of the processing oil used in forming the sealant base blend will preferably be in the range of from about 5% to about 30% by weight, more preferably in the range of from about 8% to about 25% by weight, based upon the total final weight of the inventive pigmented sealant composition after the titanium dioxide, any additional color-neutralizing materials, the one or more pigment materials, and the one or more elastomeric polymer materials have been added to the sealant base blend.

The one or more plasticizing materials used in forming the sealant base blend will preferably comprise one or more epoxidized esters of vegetable oils and will also preferably be relatively translucent or have a lighter color. Examples of epoxidized esters of vegetable oils suitable for use in forming the sealant base blend used in the inventive composition include, but are not limited to, epoxidized esters of soybean oil, corn oil, tall oil, and sunflower oil. The epoxidized ester of vegetable oil will preferably be an epoxidized ester of soybean oil and will most preferably be an epoxy functionalized methyl ester of soybean oil. Examples of other epoxidized esters of soybean oil suitable for use in the present invention include, but are not limited to, benzyl, propyl, and ethyl esters of soybean oil.

The total amount of the one or more plasticizing materials used in foaming the sealant base blend will preferably be in the range of from about 0.5% to about 6% by weight, more preferably in the range of from about 1% to about 4% by weight, based upon the total final weight of the inventive pigmented sealant composition after the titanium dioxide, any additional color-neutralizing materials, the one or more pigment materials, and the one or more elastomeric polymer materials have been added to the sealant base blend.

Because of the materials used in forming the inventive sealant base blend, the sealant base blend will have a non-white shade or color which will typically range from light yellow to light or medium brown. In accordance with the method of the present invention, the non-white shade or color of the sealant base blend will preferably be at least partially neutralized, more preferably substantially or entirely neutralized, prior to pigmenting the inventive composition to its desired final color. The non-white shade or color of the sealant base blend will preferably be significantly or entirely neutralized by: (1) maintaining the blending temperature of the sealant base blend while adding the titanium dioxide thereto with mixing and (2) continuing to maintain the blending temperature of the sealant base blend while adding any additional color-neutralizing materials thereto with mixing. Although high shear and/or high speed mixing may be needed in some circumstances, maintaining the temperature of the base blend in the range of from 300° F. to 350° F. will typically allow low speed and/or low shear mixing to be used for incorporating and dispersing the $TiO_2$ and any additional color-neutralizing materials.

When needed for incorporating the titanium dioxide and/or other color-neutralizing materials, high shear mixing can more effectively overcome the forces of attraction between adjacent $TiO_2$ or other particles, thereby more readily breaking up and dispersing $TiO_2$ or other agglomerates into separate particles.

As used herein, the term "high speed and/or high shear" means the use of mixing equipment that provides a high rate of rotation of typically in excess of 1000 rotations per minute (rpm) and more typically in excess of 2000 rpm. The high shear mixing also forces the material through a small or narrow gap, thus imparting relatively high levels of shear stress to the material and helping to break apart and disperse agglomerations.

Examples of devices and systems suitable for high speed and/or high shear mixing of the inventive composition include, but are not limited to, Silverson® laboratory mixers with high shear milling heads, rotor-stator mills, and Cowles mixers.

As used herein, the term "low speed and/or low shear" means a speed of less than 1000 rpm, more preferably less than 750 rpm, and more preferably 500 rpm or less. Examples of suitable low speed mixing devices or systems include, but are not limited to, low speed paddle mixers or agitators.

The titanium dioxide used in the inventive sealant composition and method acts as a whitener for neutralizing the yellow or brownish color of the sealant base blend. The $TiO_2$ can be in any crystalline form, including rutile or anatase titanium dioxide, and will preferably be rutile titanium dioxide. The amount of titanium dioxide added to the sealant base blend in the color-neutralization step of the inventive method will preferably be in the range of from about 3% to about 20% by weight, more preferably from about 5% to about 15% by weight, based upon the total final weight of the inventive pigmented sealant composition after the titanium dioxide, any additional color-neutralizing materials, the one or more pigment materials, and the one or more elastomeric polymer materials have been added to the sealant base blend.

Examples of additional color-neutralizing materials which can be added to the sealant base blend in the color-neutralizing step of the inventive method can include, but are not limited to, calcium carbonate, blue pigments, and combinations thereof.

When used as an additional color neutralizing agent, calcium carbonate will preferably be added to the sealant base blend in an amount in the range of from about 1% to about 20% by weight, more preferably from about 3% to 15% by weight, based upon the total final weight of the inventive pigmented sealant composition after the titanium dioxide, the calcium carbonate, any additional color-neutralizing materials, the one or more pigment materials, and the one or more elastomeric polymer materials have been added to the sealant base blend.

In many cases, even after the addition of titanium dioxide and calcium carbonate to the sealant base blend, a slight yellow color will remain. As an additional color neutralizing agent for neutralizing the remaining the yellow color, a blue pigment will preferably also be added to the sealant base blend in an amount in the range of from about 0.1% to about 5% by weight, more preferably from about 0.5% to about 2% by weight, based upon the total final weight of the inventive pigmented sealant composition after the titanium dioxide, the calcium carbonate, the blue pigment, any additional color-neutralizing materials, the one or more pigment materials, and the one or more elastomeric polymer materials have been added to the sealant base blend.

In the next step of the inventive method, the at least partially color-neutralized sealant base blend is pigmented to achieve generally any non-white shade or color desired for the final pigmented composition. In accordance with the inventive method, the at least partially color-neutralized sealant base blend will preferably be pigmented by (1) continuing to maintain the neutralized sealant base blend at the blending temperature while (2) adding one or more pigment materials to the neutralized sealant base blend with mixing. Although high shear and/or high speed mixing may be needed in some circumstances, maintaining the temperature of the color-neutralized base blend in the range of from 300° F. to 350° F. will typically allow low speed and/or low shear mixing to be used for incorporating and dispersing the one or more pigment materials.

The one or more pigment materials can be generally any heat-stable pigment(s). Examples of pigment materials suitable for use in the inventive composition to achieve desired end colors include, but are not limited to, gray pigments such as Gilsonite and red pigments such as iron oxides and hydrates of iron oxide salts.

The one or more pigment materials will preferably be added to the at least partially neutralized sealant base blend as needed to achieve the desired end color. The one or more pigment materials will typically be added in an amount in the range of from 0.1% to about 6% by weight, more typically from about 0.3% to about 4% by weight, based upon the total final weight of the inventive pigmented sealant composition after the titanium dioxide, any additional color-neutralizing materials, the one or more pigment materials, and the one or more elastomeric polymer materials have been added to the sealant base blend.

As will be understood by those skilled in the art, pigments sometimes include carrier materials. Consequently, as used herein and in the claims, a weight amount or percentage amount or concentration stated for any color-neutralizing material or pigment material used in the inventive composition includes any carrier material which is contained in the color-neutralizing or pigment material.

The use of Gilsonite powder in the pigmenting step has shown to be particularly effective in achieving a gray tone similar or identical to Portland cement concrete.

Following the pigmenting step, one or more elastomeric polymer materials are added to the pigmented sealant base blend in order to modify the inventive sealant composition to provide enhanced mechanical properties. Examples of elastomer materials suitable for use in the inventive composition include, but are not limited to: styrene block polymers such as styrene butadiene styrene (SBS), styrene butadiene, styrene isoprene, and styrene isoprene styrene (SIS); ethylene vinyl acetate (EVA); polymers such as ethylene-propylene-diene monomer rubber (EPDM) formed by the copolymerization of ethylene and propylene with suitable monomers to disrupt crystallinity; acrylic copolymers and terpolymers such as butyl acrylate and glycidyl methacrylate, which are derived from copolymerization of ethylene with acrylic monomers; and combinations thereof. The one or more elastomeric polymer materials will preferably comprise an SBS polymer and/or an SIS polymer and will more preferably comprise a radial SBS polymer.

In accordance with the inventive method, the one or more elastomeric polymer materials are preferably added to the pigmented sealant base blend by (1) increasing the temperature of the pigmented sealant base blend to a temperature in the range of from about 350° F. to about 385° F., (2) adding the one or more elastomeric polymer materials, preferably with low shear agitation or mixing, while maintaining a temperature of from about 350° F. to about 385° F., and (3) continuing the low shear agitation or mixing at a temperature of from about 350° F. to about 385° F. until complete dissolution of the polymer material(s) is achieved (typically at least 6 hours). The one or more elastomeric polymer materials will preferably be added to the pigmented sealant base blend in an amount in the range of from about 2% to about 20% by weight, more preferably from about 3% to about 15% by weight, based upon the total weight of the final pigmented sealant product composition.

Once prepared, the hot, pigmented sealant composition provided by the present invention can be applied to a concrete or asphalt substrate surface to seal cracks and joints using generally any of the procedures and equipment used for applying asphalt-based sealants.

The following examples are provided solely for the purpose of illustration, not limitation.

Example 1

This example provided a hot-applied, non-asphalt based, pigmented sealant product composition which was prepared in accordance with the present invention. Unless otherwise indicated, all percentages stated in this example are percentages by weight based upon the total final weight of the pigmented sealant product composition.

A non-asphalt base blend was formed by combining 43.9% of Westrez Rosin Ester 5101 (a pine-based pentaerythritol ester resin produced by Ingevity of Charleston, SC) with 23% of Sundex 165 (an aromatic processing oil having a molecular weight of 588 and an aromatic content of 55% by weight based upon the total weight of the Sundex 165) and 2% of EMS-100 (an epoxidized methyl ester of soybean oil manufactured by ACS of Indiana).

The non-asphalt base blend was heated to 325° F. and fully homogenized, using a low speed paddle blender at 450 RPM, for a period suitable to fully melt and incorporate the rosin ester particles into the processing oil. The non-asphalt base blend had a softening point of 50° C. and a needle penetration of 35 dmm at 25° C. and was therefore comparable to an AC-20 or AC-30 base asphalt.

Next, 10.5% of $TiO_2$ (PL-4950 manufactured by PL Industries) was added to the 325° F. base blend, with low shear mixing at 450 RPM, as a color-neutralizing material to whiten the base blend. After the addition and incorporation of the $TiO_2$, the base blend still had a slight yellow color. Consequently, 8.8% of calcium carbonate (HuberCarb M4) and 0.9% of an Ultramarine Blue pigment (ME-2387 available from PL Industries) were added and incorporated into the blend at 325° F. with continued low shear mixing to fully neutralize the slight yellow color.

After the color of the base blend was neutralized, the color-neutralized base blend was pigmented by adding 0.9% of Gilsonite HMA powder at 325° F. with low shear mixing at 450 RPM to give the base composition a gray color resembling the color of Portland cement concrete.

Next, 10% of a high molecular weight SBS polymer with a radial architecture (Dynasol Solprene 411) was added to the pigmented base blend at 370° F. with low shear mixing at 450 RPM. The mixing was continued for six hours until the SBS polymer was fully incorporated.

The resulting pigmented sealant product composition was gray in color and had excellent adhesion to concrete. When tested in accordance with the parameters set forth in ASTM D6690, the pigmented sealant product had: (1) a Ring and Ball Softening Point of 84° C.; (2) a Cone Penetration of 48 dmm at 25° C.; (3) a Resilience of 68% at 25° C.; and (4) a Ductility (ASTM D113) of 48 cm at 4° C.

Example 2

This example provided a second hot-applied, non-asphalt based, pigmented sealant product composition which was prepared in accordance with the present invention. Unless otherwise indicated, all percentages stated in this example are percentages by weight based upon the total final weight of the second pigmented sealant product composition.

A second non-asphalt base blend was produced by combining 58.6% of Westrez Rosin Ester 5101 with 9.7% of crude soybean oil and 1.4% of EMS-100. The non-asphalt base blend was heated to 310° F. and fully homogenized, with low shear mixing at 450 RPM, until the rosin ester particles were fully melted and incorporated into the processing oil. The non-asphalt base blend had a softening point of 51° C. and a needle penetration of 46 dmm at 25° C. and was therefore comparable to an AC-20 or AC-30 base asphalt.

Next, 10% of $TiO_2$ was added to the 310° F. base blend, with continued low shear mixing at 450 RPM, as a color-neutralizing material to whiten the base blend. After the addition and incorporation of the $TiO_2$, 9.8% of calcium carbonate was added and incorporated into the blend to further neutralize the color. Compared to Example 1, the neutralized base blend of Example 2 had a brighter white color with less yellow due to the superior color of the crude soybean oil. The color-neutralized base blend of Example 2 therefore did not require the addition of a blue pigment.

Following neutralization, the base blend was pigmented by adding 0.5% of Gilsonite HMA powder at 310° F. with low shear mixing at 450 RPM to produce a light tan to brown color.

Next, 10% of a high molecular weight SBS polymer with a radial architecture was added to the pigmented base blend at 370° F. with low shear mixing at 450 RPM. The mixing was continued for six hours until the SBS polymer was fully incorporated.

The resulting pigmented sealant product of Example 2 was tan in color and had excellent adhesion to concrete. When tested in accordance with the parameters set forth in ASTM D6690, the pigmented sealant product of Example 2 had: (1) a Ring and Ball Softening Point of 76° C.; (2) a Cone Penetration of 47 dmm at 25° C.; (3) a Resilience of 45% at 25° C.; and (4) a Ductility (ASTM D113) of 43 cm at 4° C.

While still acceptable, the inventive pigmented sealant product of Example 2 had a lower softening point and resilience as compared to the inventive pigmented sealant composition of Example 1. This was likely due to the SBS polymer being less compatible with soybean oil than with aromatic oil.

Example 3

This example provided a third hot-applied, non-asphalt based, pigmented sealant product composition which was prepared in accordance with the present invention. Unless otherwise indicated, all percentages stated in this example are percentages by weight based upon the total final weight of the third pigmented sealant product composition.

A third non-asphalt base blend was produced by combining 46.9% of Westrez Rosin Ester 5101 with 21% of a heavy paraffinic processing oil (Hydrolene 90T) and 2.1% of EMS-100. The non-asphalt base blend was heated to 310° F. and fully homogenized, with low speed mixing at 450 RPM, until the rosin ester particles were fully melted and incorporated into the processing oil. The non-asphalt base blend had a softening point of 48° C. and a needle penetration of 50 dmm at 25° C., and was therefore comparable to an AC-20 or AC-30 base asphalt.

Next, 10% of $TiO_2$ was added to the 310° F. base blend, with continued low shear mixing at 450 RPM, as a color-neutralizing material to whiten the base blend. After the addition and incorporation of the $TiO_2$, 8% of calcium carbonate was added and incorporated into the blend. Compared to the base blend of Example 1, after the addition of the calcium carbonate, the base blend of Example 3 had a darker yellow color due to the deeper brown color of the Hydrolene 90T oil as compared to the Sundex 165 aromatic processing oil used in Example 1. The base blend of Example 3 required 1% of the Ultramarine blue pigment to fully neutralize the yellow color.

After the color of the base blend was neutralized, the color-neutralized base blend was pigmented by adding 1% of Gilsonite HMA powder at 325° F. with low shear mixing at 450 RPM to give the base composition a gray color resembling the color of Portland cement concrete.

Next, 10% of a high molecular weight SBS polymer with a radial architecture was added to the pigmented base blend at 370° F. with low shear mixing at 450 RPM. The mixing was continued for six hours until the SBS polymer was fully incorporated.

The resulting pigmented sealant product composition was identical in color to Portland cement concrete and had excellent adhesion to concrete. When tested in accordance with the parameters set forth in ASTM D6690, the pigmented sealant product of Example 3 had: (1) a Ring and Ball Softening Point of 68° C.; (2) a Cone Penetration of 47 dmm at 25° C.; (3) a Resilience of 33% at 25° C.; and (4) a Ductility (ASTM D113) of 27 cm at 4° C.

While still acceptable, the inventive pigmented sealant product of Example 3 had a lower softening point, resilience, and ductility as compared to the inventive pigmented sealant composition of Example 1.

Thus, the present invention is well adapted to carry out the objects and attain the ends and advantages mentioned above as well as those inherent therein. While presently preferred embodiments have been described for purposes of this disclosure, numerous changes and modifications will be apparent to those in the art. Such changes and modifications are encompassed within this invention as defined by the claims.

What is claimed is:

1. A method of producing a pigmented sealant product composition for cracks and joints in pavements and other substrates, the method comprising the steps of:
   a) forming a sealant base blend having substantially no asphalt therein, the sealant base blend comprising (i) a rosin ester material, (ii) processing oil, and (iii) one or more plasticizers, the sealant base blend being formed at a temperature, and with agitation, stirring, and/or mixing, to melt the rosin ester material and incorporate the rosin ester material into the processing oil;
   b) at least partially neutralizing a non-white shade or color of the sealant base blend, to produce an at least partially color-neutralized base blend, by adding one or more color-neutralizing materials to the sealant base blend, the one or more color-neutralizing materials comprising titanium dioxide;
   c) pigmenting the at least partially color-neutralized base blend, to form a pigmented base blend, by adding one or more pigment materials to the at least partially color-neutralized base blend; and
   d) adding one or more elastomeric polymer materials to the pigmented base blend to form the pigmented sealant product composition,
   the rosin ester material being present in the sealant base blend formed in step (a) in an amount which is greater than 40% by weight based upon a total weight of the pigmented sealant product composition, wherein the total weight of the pigmented sealant product composition comprises a total combined weight of the rosin ester material, the processing oil, the one or more plasticizers, the one or more color-neutralizing materials, the one or more pigment materials, and the one or more elastomeric polymer materials.

2. The method of claim 1 further comprising the one or more pigment materials added in step (c) imparting a non-white shade or color to the at least partially color-neutralized base blend.

3. The method of claim 1 further comprising:
   the processing oil being used in step (a) in an amount in a range of from 5% to 30% by weight based upon the total weight of the pigmented sealant product composition and
   the processing oil comprising one or more aromatic oils, naphthenic oils, paraffinic oils, vegetable oils, or a combination thereof.

4. The method of claim 1 comprising the rosin ester material being a pine-based pentaerythritol ester resin.

5. The method of claim 1 comprising the processing oil having an aromatic content of at least 45% by weight based upon a total weight of the processing oil.

6. The method of claim 1 further comprising step (a) comprising the steps of:
   heating the processing oil to a temperature in a range of from 300° to 350° F.;
   adding the one or more plasticizers to the heated processing oil with agitation, stirring, and/or mixing; and
   adding the rosin ester material to the heated processing oil with agitation, stirring and/or mixing.

7. The method of claim 1 further comprising the one or more plasticizers being selected from epoxidized esters of vegetable oils.

8. The method of claim 1 further comprising:
   the titanium dioxide being used in step (b) in an amount in a range of from 3% to 20% by weight based upon the total weight of the pigmented sealant product composition;
   the one or more color-neutralizing materials further comprising calcium carbonate; and
   the calcium carbonate being used in step (b) in a total amount in a range of from 1% to 20% by weight based upon the total weight of the pigmented sealant product composition.

9. The method of claim 8 further comprising the one or more color-neutralizing materials also comprising a blue pigment in an amount of from 0.1% to 5% by weight based upon the total weight of the pigmented sealant product composition.

10. The method of claim 1 further comprising the one or more pigment materials added in step (c) comprising a Gilsonite powder.

11. The method of claim 1 further comprising:
   the one or more elastomeric polymer materials added in step (d) being selected from styrene butadiene styrene, styrene butadiene, styrene isoprene, styrene isoprene styrene, ethylene vinyl acetate, ethylene-propylene-diene monomer rubber, acrylic copolymers and terpolymers derived from copolymerization of ethylene with acrylic monomers, or combinations thereof and
   the one or more elastomeric polymer materials being added in step (d) in a total amount in a range of from 2% to 20% by weight based upon the total weight of the pigmented sealant product composition.

12. The method of claim 1 further comprising:
   the processing oil being used in step (a) in an amount in a range of from 5% to 30% by weight based upon the total weight of the pigmented sealant product composition;

the titanium dioxide being used in step (b) in an amount in a range of from 3% to 20% by weight based upon the total weight of the pigmented sealant product composition; and the one or more elastomeric polymer materials being added in step (d) in a total amount in a range of from 2% to 20% by weight based upon the total weight of the pigmented sealant product composition.

13. The method of claim 12 further comprising:

the rosin ester material being a pine-based pentaerythritol ester resin;

the processing oil comprising one or more aromatic oils, naphthenic oils, paraffinic oils, vegetable oils, or a combination thereof; and the one or more plasticizers being selected from epoxidized esters of vegetable oils.

14. The method of claim 13 further comprising the one or more pigment materials added in step (c) comprising a Gilsonite powder.

15. The method of claim 13 further comprising the one or more plasticizers being used in step (a) in an amount in a range of from 0.5% to 6% by weight based upon the total weight of the pigmented sealant product composition.

16. The method of claim 1 further comprising the amount of the rosin ester material present in the sealant base blend formed in step (a) being in a range of from 41% to 65% by weight based upon the total weight of the pigmented sealant product composition.

17. The method of claim 1 further comprising the amount of the rosin ester material present in the sealant base blend formed in step (a) being at least 42% by weight based upon the total weight of the pigmented sealant product composition.

18. A method of producing a pigmented sealant product composition for cracks and joints in pavements and other substrates, the method comprising the steps of:

a) forming a sealant base blend having substantially no asphalt therein, the sealant base blend comprising (i) a rosin ester material, (ii) processing oil, and (iii) one or more plasticizers, the sealant base blend being formed at a temperature, and with agitation, stirring, and/or mixing, to melt the rosin ester material and incorporate the rosin ester material into the processing oil;

b) adding one or more pigment materials to the sealant base blend; and c) adding one or more elastomeric polymer materials to the sealant base blend, the rosin ester material being present in the sealant base blend formed in step (a) in an amount which is greater than 40% by weight based upon a total weight of the pigmented sealant product composition, wherein the total weight of the pigmented sealant product composition comprises a total combined weight of the rosin ester material, the processing oil, the one or more plasticizers, the one or more pigment materials, and the one or more elastomeric polymer materials.

19. The method of claim 18 further comprising adding one or more color-neutralizing materials to the sealant base blend, the one or more color-neutralizing materials comprising titanium dioxide, and the total weight of the pigmented sealant product composition also including a total weight of the one or more color-neutralizing materials.

20. The method of claim 18 further comprising:

the rosin ester material being a pine-based pentaerythritol ester resin;

the processing oil comprising one or more aromatic oils, naphthenic oils, paraffinic oils, vegetable oils, or a combination thereof; and the one or more plasticizers being selected from epoxidized esters of vegetable oils.

* * * * *